US009793940B2

(12) United States Patent
Otsubo et al.

(10) Patent No.: US 9,793,940 B2
(45) Date of Patent: Oct. 17, 2017

(54) COVER FOR MOBILE DEVICE

(71) Applicant: MAZDA MOTOR CORPORATION, Hiroshima (JP)

(72) Inventors: Yoshinori Otsubo, Higashihiroshima (JP); Kazunari Muranaka, Irvine, CA (US)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/117,989

(22) PCT Filed: Feb. 20, 2015

(86) PCT No.: PCT/JP2015/054868
§ 371 (c)(1),
(2) Date: Aug. 10, 2016

(87) PCT Pub. No.: WO2015/146400
PCT Pub. Date: Oct. 1, 2015

(65) Prior Publication Data
US 2017/0012658 A1    Jan. 12, 2017

(30) Foreign Application Priority Data

Mar. 28, 2014 (JP) ................. 2014-068269

(51) Int. Cl.
*H04M 1/00* (2006.01)
*H04B 1/3888* (2015.01)
(Continued)

(52) U.S. Cl.
CPC ....... *H04B 1/3888* (2013.01); *G07C 9/00174* (2013.01); *H04M 1/185* (2013.01);
(Continued)

(58) Field of Classification Search
CPC ............. A45C 2011/002; G06F 1/1632; G06F 2200/1633; H04B 1/3883; H04B 1/3888; H04M 1/04; H04M 1/72527
(Continued)

(56) References Cited

U.S. PATENT DOCUMENTS

2011/0287726 A1   11/2011   Huang
2011/0287808 A1   11/2011   Huang
2013/0151038 A1    6/2013   Harumoto et al.

FOREIGN PATENT DOCUMENTS

JP    H07-193884 A    7/1995
JP    H10-317753 A   12/1998
(Continued)

OTHER PUBLICATIONS

International Search Report issued in PCT/JP2015/054868; dated May 19, 2015.
(Continued)

*Primary Examiner* — Eugene Yun
(74) *Attorney, Agent, or Firm* — Studebaker & Brackett PC

(57) ABSTRACT

A cover for a mobile device includes a cover body to be mounted on the mobile device, an operation portion provided on the cover body and capable of receiving an external operation, a transmission portion which transmits an operation signal for remotely operating a vehicle-mounted device when the operation portion receives the operation, a determination portion which determines whether or not the mobile device is in a specific state, and a restricting device which executes a process for restricting the remote operation when the determination portion determines that the mobile device is in the specific state.

7 Claims, 6 Drawing Sheets

(51) Int. Cl.
*H04Q 9/00* (2006.01)
*G07C 9/00* (2006.01)
*H04M 1/18* (2006.01)
*H04M 1/725* (2006.01)

(52) U.S. Cl.
CPC ... *H04M 1/72533* (2013.01); *H04M 1/72569* (2013.01); *H04Q 9/00* (2013.01)

(58) Field of Classification Search
USPC ..................................................... 455/575.8
See application file for complete search history.

(56) References Cited

FOREIGN PATENT DOCUMENTS

| | | |
|---|---|---|
| JP | 2004-173319 A | 6/2004 |
| JP | 2007-028206 A | 2/2007 |
| JP | 2010-056970 A | 3/2010 |
| JP | 2011-082644 A | 4/2011 |
| JP | 2013-121735 A | 6/2013 |
| JP | 2013-530628 A | 7/2013 |

OTHER PUBLICATIONS

An Office Action; "Notification of Reasons for Refusal" issued by the Japanese Patent Office dated Apr. 25, 2017, which corresponds to Japanese Patent Application No. 2014-068269 and is related to U.S. Appl. No. 15/117,989; with English language translation.

COVER FOR MOBILE DEVICE

TECHNICAL FIELD

The present invention relates to a cover for use in a mobile device such as a smartphone (mobile phone), a tablet PC, or the like, and more particularly, to a cover for a mobile device provided with a keyless operation function for a vehicle such as a keyless entry function.

BACKGROUND ART

In recent years, as a so-called keyless entry system, there are proposed various systems enabling locking/unlocking of a vehicle or the like by operating a mobile phone, in place of using a key-holder or a key. For instance, Patent Literature 1 proposes a system, in which locking/unlocking a vehicle is performed or various operations of vehicle-mounted devices are performed by causing a center to communicate with the vehicle-mounted devices on the basis of an operation of a mobile phone. Further, Patent Literature 2 proposes a mobile phone such that a transmitter or a control circuit for locking/unlocking is incorporated in a phone body, and locking/unlocking a vehicle is performed by directly transmitting a signal from the mobile phone to the vehicle according to an operation of the mobile phone.

In a system using a communication line of a mobile phone as disclosed in Patent Literature 1, however, a development cost rises, and a communication fee or the like is also involved. Therefore, it is difficult to provide an inexpensive system. Further, in the case of Patent Literature 2, in addition to the necessity of newly developing a mobile phone itself, the degree of freedom in selecting a mobile phone by the user may be narrowed, because the mobile phone is used as a dedicated device for a vehicle. In view of the above, in recent years, there is proposed an idea that a keyless entry function is substantially provided in a mobile phone by loading a transmitter or an operation button for locking/unlocking on a cover for the mobile phone (especially, a cover for a smartphone). According to this configuration, it is possible to provide a mobile phone with a keyless entry function with a simplified and inexpensive configuration without impairing the degree of freedom in selecting a mobile phone by the user.

When a transmitter or an operation button for locking/unlocking is provided in a cover for a mobile phone, however, there may occur an erroneous operation e.g. a case in which the operation button provided on the cover is pressed against the user's intention during an operation of the mobile phone, and the vehicle may be locked/unlocked. Therefore, it is necessary to prevent such an erroneous operation.

CITATION LIST

Patent Literature

Patent Literature 1: Japanese Unexamined Patent Publication No. 2013-121735
Patent Literature 2: Japanese Unexamined Patent Publication No. H10-317753

SUMMARY OF INVENTION

In view of the above, an object of the present invention is to provide a cover for a mobile device, which enables to provide the mobile device with a keyless operation function with a simplified and inexpensive configuration, without impairing the degree of freedom in selecting a mobile device by the user, and enables to prevent an erroneous operation of the mobile device.

A cover for a mobile device according to the present invention includes a cover body to be mounted on a mobile device; an operation portion provided on the cover body, and capable of receiving an external operation; a transmission portion which transmits an operation signal for remotely operating a vehicle-mounted device when the operation portion receives the operation; a determination portion which determines whether or not the mobile device is in a specific state; and a restricting means which executes a process for restricting the remote operation when the determination portion determines that the mobile device is in the specific state.

DESCRIPTION OF EMBODIMENTS

In the following, preferred embodiments of the present invention are described referring to the accompanying drawings.

(First Embodiment)

Figure 1:
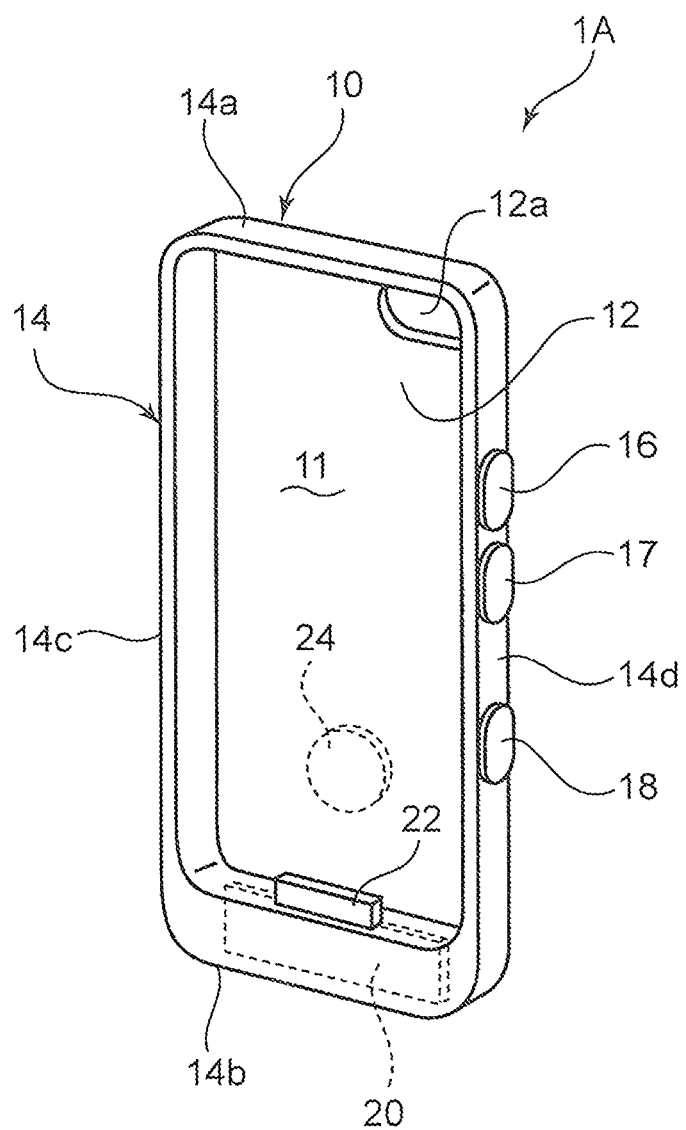
FIG. 1 is a perspective view of a smartphone cover (first embodiment), which is a cover for a mobile device embodying the present invention.
Figure 2:
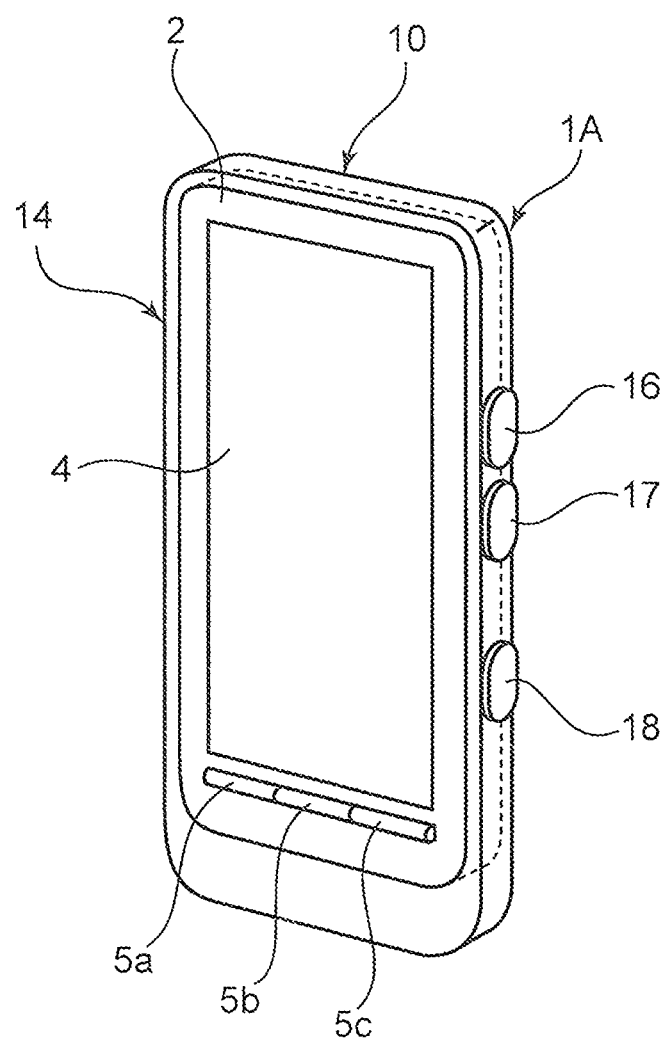
FIG. 2 is a perspective view of a smartphone mounted with the smartphone cover.

FIG. 1 is a perspective view illustrating a smartphone cover, which is a cover for a mobile device embodying the present invention. FIG. 2 is a perspective view illustrating a smartphone mounted with the smartphone cover. In the following description, the smartphone cover is described on the basis of the states illustrated in FIG. 1 and FIG. 2.

As illustrated in FIG. 1, a smartphone cover 1A (hereinafter, abbreviated as a cover 1A) includes a rectangular-shaped cover body 10 with a small thickness in the front-rear direction of the cover 1A. The cover body 10 is provided with a plate-shaped back surface portion 12 with a long size in the up-down direction of the cover 1A, and a peripheral wall portion 14 around the back surface portion 12. The back surface portion 12 and the peripheral wall portion 14 are integrally formed of a same resin material. An accommodation portion 11 of a smartphone 2 is formed inside the peripheral wall portion 14 of the cover body 10. As illustrated in FIG. 2, by accommodating the smartphone 2 in the accommodation portion 11, the cover 1A is mounted on the smartphone 2.

The smartphone 2 has a rectangular parallelepiped shape with a small thickness in the front-rear direction. The smartphone 2 is provided with, on a front surface portion thereof, a rectangular display portion 4 constituted by a touch panel, and three selection keys 5a, 5b, and 5c arranged in a row in the left-right direction on the lower side of the display portion 4. The front surface portion where the display portion 4 and the selection keys 5a to 5c are provided serves as a principal plane of the smartphone 2. The smartphone 2 is accommodated in the accommodation portion 11 in such a manner that the principal plane faces the outside through an opening of the accommodation portion 11.

Although illustration is omitted, there is provided, on a lower surface of the smartphone 2, a smartphone-side connector (corresponding to a device-side first connector of the present invention) constituted by a female connector provided with a battery charging terminal, and a communication terminal with respect to an external device (such as a personal computer).

The peripheral wall portion 14 of the cover body 10 has a shape corresponding to the contour of the smartphone 2. The peripheral wall portion 14 includes an upper side portion 14a, a lower side portion 14b, a left side portion 14c, and a right side portion 14d, which are respectively engaged with an upper surface, the lower surface, a left surface, and a right surface of the smartphone 2.

The right side portion 14d (corresponding to a side surface portion of the cover of the present invention) of the peripheral wall portion 14 of the cover body 10 is provided with a plurality of operation buttons (corresponding to an operation portion of the present invention) for use in operating a vehicle-mounted device in a keyless manner Specifically, the operation buttons are a lock button 16 for use in bringing a door lock mechanism of a vehicle to a locked state, an unlock button 17 for use in bringing the door lock mechanism to an unlocked state, and an engine start button 18 for use in starting the engine in this order from the upper side. These buttons 16 to 18 are of a pressing type, and are configured in such a manner that the user can easily press the buttons with his/her thumb while holding the smartphone 2 mounted with the cover 1A (hereinafter, simply referred to as the smartphone 2) on his/her right hand.

The lower side portion 14b of the peripheral wall portion 14 of the cover body 10 is internally provided with a control substrate 20 for transmitting an operation signal according to an operation of the buttons 16 to 18, namely, a signal for controlling the door lock mechanism and the engine.

As illustrated in FIG. 1, the control substrate 20 is provided with a substrate-side connector 22 (corresponding to a cover-side first connector of the present invention) for electrically connecting the control substrate 20 and the smartphone 2. The substrate-side connector 22 is a male connector mounted on the control substrate 20. The substrate-side connector 22 projects toward the inside of the accommodation portion 11 from an inner wall surface of the lower side portion 14b of the cover body 10. In other words, when the cover 1A is mounted on the smartphone 2, the substrate-side connector 22 is engaged with the smartphone-side connector. Thus, the control substrate 20 and a control substrate 40 (illustrated in FIG. 3) in the smartphone 2 are electrically connected to each other.

The numeral 12a in FIG. 1 indicates an opening portion for a camera, which is formed in the back surface of the smartphone 2 for a lens window of the camera. The numeral 24 indicates a battery, which is a power source of the control substrate 20. Although illustration is omitted, a detachable lid portion is formed on the back surface of the cover 1A (an outer surface of the back surface portion 12 of the cover body 10). Attachably detaching the lid portion makes it possible to exchange a battery.

Figure 3:
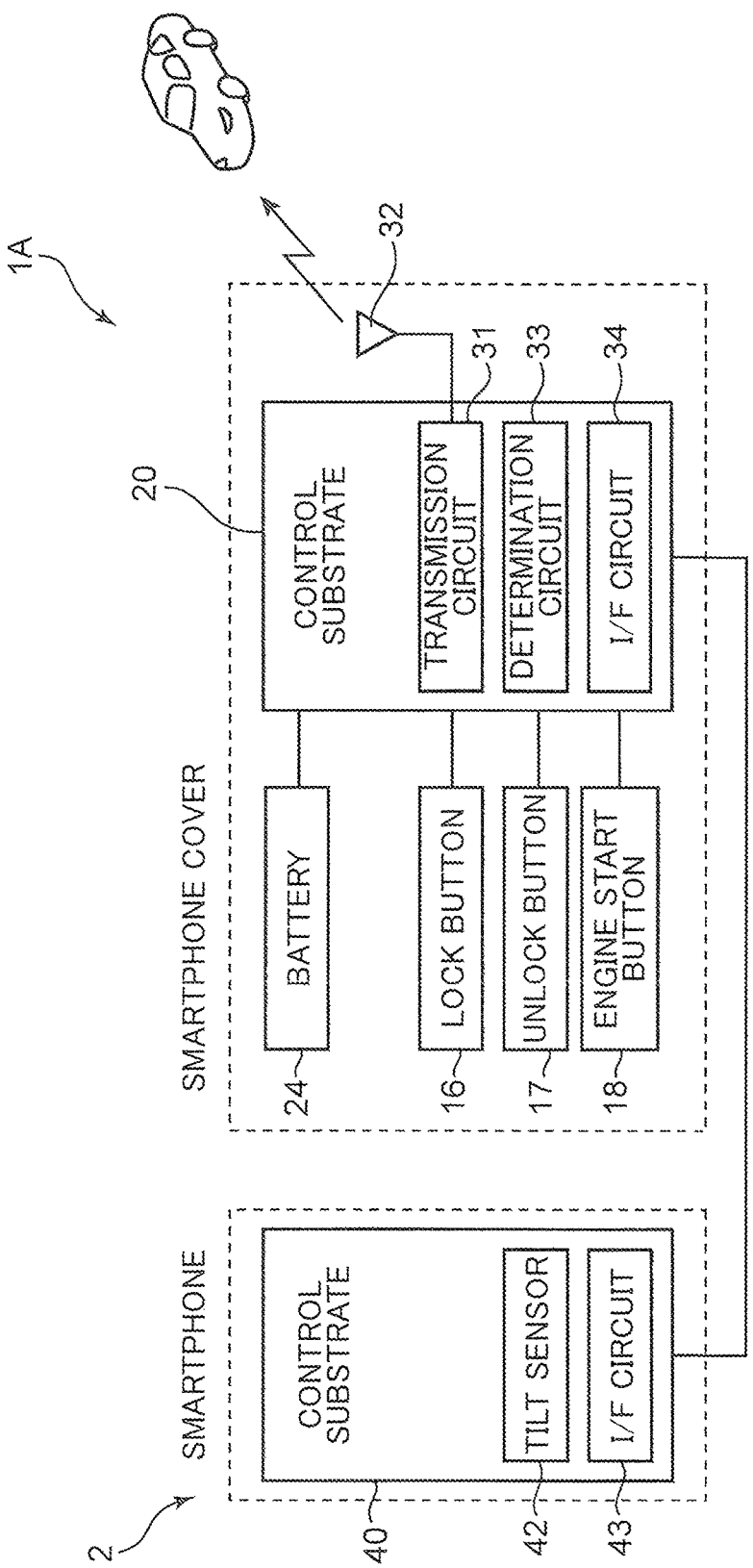
FIG. 3 is a block diagram illustrating an electrical configuration of the smartphone cover.

FIG. 3 is a block diagram illustrating an electrical configuration of the cover 1A. As illustrated in FIG. 3, all the buttons 16 to 18, and the battery 24 are electrically connected to the control substrate 20. The control substrate 20 is loaded with a microcomputer or the like. The control substrate 20 includes, as main functional blocks, a transmission circuit 31 including an antenna 32, a determination circuit 33, an I/F (interface) circuit 34, and the like.

The transmission circuit 31 (corresponding to a transmission portion of the present invention) transmits, to a vehicle, an operation signal for controlling the door lock mechanism or the engine according to an operation of pressing the buttons 16 to 18. The operation signal includes an identification signal. When an identification number attached to the identification signal matches with a pre-registered number, the vehicle switches the door lock mechanism to a locked state or to an unlocked state, and starts the engine (starter) according to an operation of pressing the buttons 16 to 18.

The determination circuit 33 (corresponding to a determination portion of the present invention) restricts transmission of an operation signal by the transmission circuit 31 depending on a usage state of the smartphone 2. In this example, the determination circuit 33 determines whether or not the buttons 16 to 18 face upward (a state that the right surface of the smartphone 2 faces upward). The determination circuit 33 restricts transmission of an operation signal by the transmission circuit 31 when the smartphone 2 is in a state other than a state that the buttons 16 to 18 face upward. Specifically, in this example, the determination circuit 33 also functions as a restricting device of the present invention.

More specifically, the control substrate 40 to be incorporated in the smartphone 2 is loaded with a tilt sensor 42 for detecting a posture of the smartphone 2. The determination circuit 33 acquires posture information to be output from the tilt sensor 42 via the I/F circuit 34 of the substrate 20, and via an I/F circuit 43 of the substrate 40, and determines whether or not the buttons 16 to 18 face upward on the basis of the posture information. This function is implemented by storing an application software (application) for allowing acquisition of posture information by the determination circuit 33 in advance in the smartphone 2. For instance, posture information detected by the tilt sensor 42 is transmitted from the control substrate 40 in the smartphone 2 to the control substrate 20 in the cover 1A in response to e.g. a request signal from the determination circuit 33.

Figure 4:
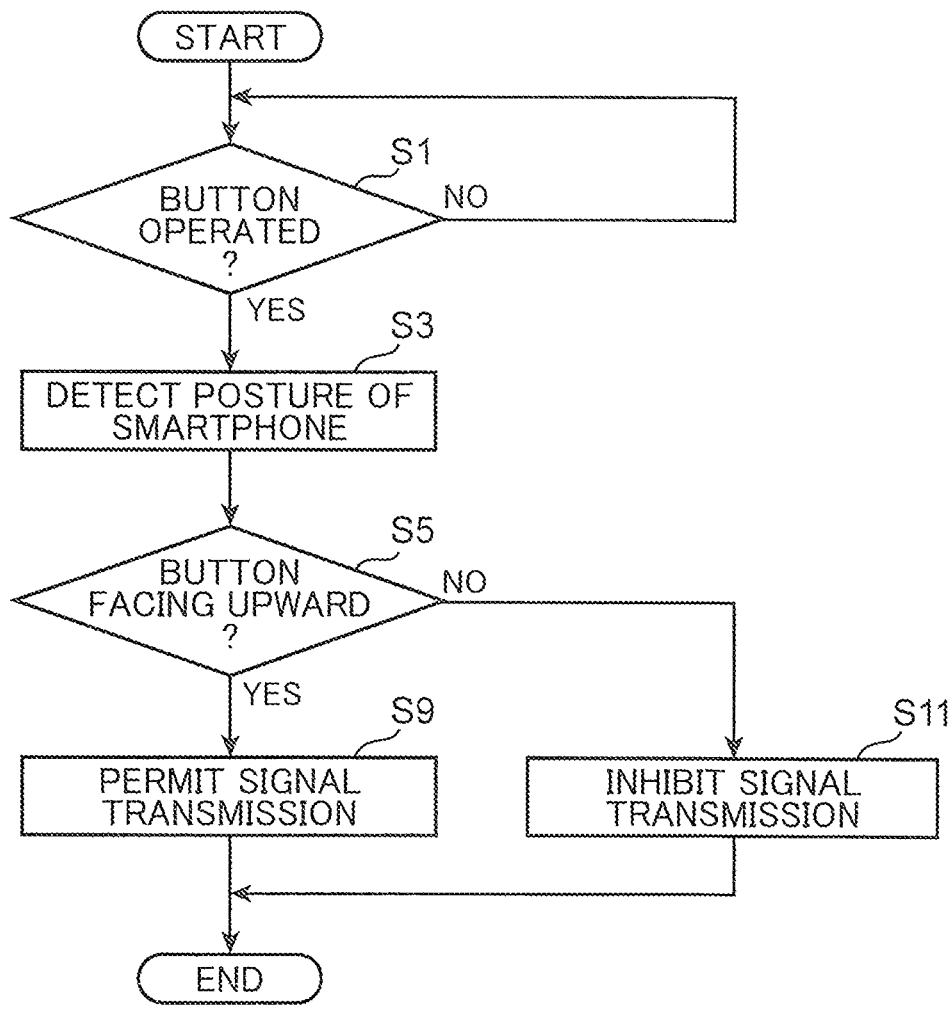
FIG. 4 is a flowchart illustrating an example of transmission control of an operation signal in the smartphone cover.

Next, transmission control of the operation signal in the cover 1A (control substrate 20) is described according to the flowchart of FIG. 4.

When the control illustrated in FIG. 4 is started, the determination circuit 33 waits for a pressing operation of one of the buttons 16 to 18. When one of the buttons 16 to 18 is pressed (YES in Step S1), the determination circuit 33 acquires posture information to be detected by the tilt sensor 42 from the smartphone 2 (Step S3).

Then, the determination circuit 33 determines whether or not the buttons 16 to 18 face upward on the basis of the posture information (Step S5). When the determination result in Step S5 is YES, the determination circuit 33 outputs a permission signal to the transmission circuit 31, and causes the transmission circuit 31 to transmit an operation signal associated with the pressed button out of the buttons 16 to 18 (Step S9). Then, the flowchart is terminated.

On the other hand, when the determination result in Step S5 is NO, in other words, when it is determined that the buttons 16 to 18 do not face upward, the determination circuit 33 outputs an inhibit signal to the transmission circuit 31, and inhibits the transmission circuit 31 from transmitting an operation signal (Step S11). Then, the flowchart is terminated without causing the transmission circuit 31 to transmit an operation signal.

According to the thus-configured cover 1A, by merely mounting the cover 1A to the smartphone 2, it is possible to provide the smartphone 2 with a function of performing a locking/unlocking operation of the door lock mechanism, and an engine starting operation in a keyless manner Therefore, it is possible to provide the smartphone 2 with the aforementioned keyless operation function with a simplified and inexpensive configuration, without impairing the degree of freedom in selecting the smartphone 2 by the user.

Further, according to the cover 1A, transmission of an operation signal from the transmission circuit 31 is restricted (inhibited) even when one of the buttons 16 to 18 is pressed, as far as the smartphone 2 is in a state other than a state that the buttons 16 to 18 face upward (a state that the right surface of the smartphone 2 faces upward). This makes it possible to avoid a situation that the door lock mechanism or the engine is operated against the user's intention during an operation of the smartphone 2 e.g. during an operation of transmitting/receiving an email or browsing a site on the Internet, or during a phone call. Specifically, normally, during an operation of transmitting/receiving an email, or browsing a site on the Internet, the display portion 4 faces upward, and during a phone call, the smartphone 2 is in an upright posture (the posture illustrated in FIG. 2). Therefore, according to the aforementioned configuration, in which transmission of an operation signal from the transmission circuit 31 is restricted (inhibited) in a state other than a state that the buttons 16 to 18 face upward, it is possible to avoid that the door lock mechanism or the like is operated against the user's intention during an operation of the smartphone 2.

In addition to the above, in the cover 1A, the determination circuit 33 acquires posture information to be detected by the tilt sensor 42 to be incorporated in the smartphone 2, and determines whether or not the buttons 16 to 18 face upward on the basis of the posture information. This is advantageous in preventing the aforementioned erroneous operation during use of the smartphone 2 with a reasonable configuration that a function of the smartphone 2 is used. Specifically, the smartphone 2 is loaded with a tilt sensor, with which the user can use the smartphone 2 as an operation tool for a game or the like. Thus, the cover 1A has a reasonable configuration employing a tilt sensor.

Figure 5:
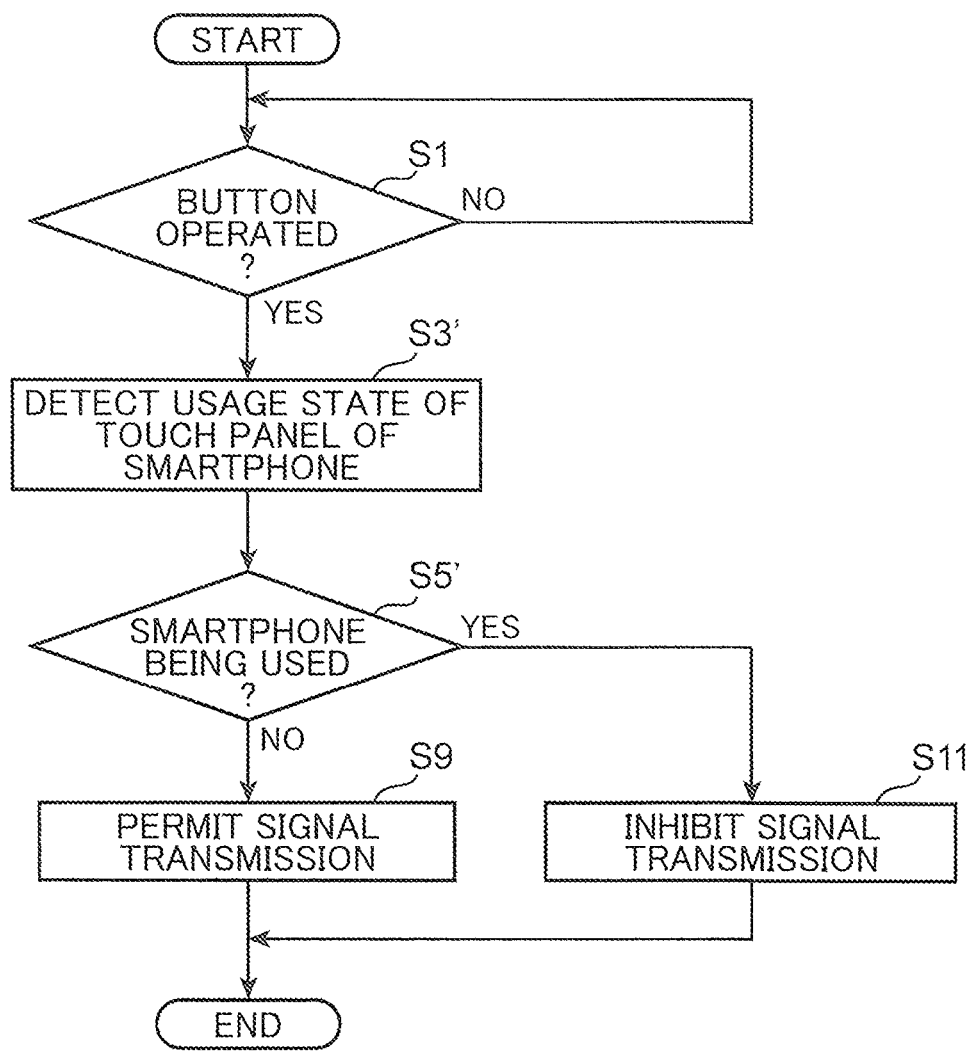
FIG. 5 is a flowchart illustrating another example of transmission control of an operation signal in the smartphone cover.

In the cover 1A, it is determined whether or not the buttons 16 to 18 face upward on the basis of posture information to be detected by the tilt sensor 42 (Step S3 and S5 in FIG. 4). In place of the determination processes as described above, as illustrated in FIG. 5, it is possible to more directly determine whether or not the smartphone 2 is used (Step S3' and Step S5'). Specifically, when the display portion 4 of the smartphone 2 is constituted by e.g. an electrostatic capacitance type touch panel, namely, a touch panel configured such that an electric field is formed on a surface of a panel, and position detection is performed by detecting a change in surface electric charge of a portion touched by the user, position detection information of the touch panel is acquired by the determination circuit 33. Then, the determination circuit 33 determines whether or not the smartphone 2 is used. When it is determined that the smartphone 2 is used, transmission of an operation signal by the transmission circuit 31 is inhibited. According to the aforementioned configuration, it is possible to more directly determine whether or not the smartphone 2 is used. This makes it possible to more securely prevent an operation of the door lock mechanism or the like against the user's intention during use of the smartphone 2.

In this case, the process of Step S5' and the process of Step S5 in FIG. 4 may be performed in combination, in place of performing the process of Step S5' alone. In other words, when the smartphone 2 is not used, or when the buttons 16 to 18 do not face upward, transmission of an operation signal by the transmission circuit 31 may be inhibited. According to this configuration, it is possible to more securely prevent the aforementioned erroneous operation during use of the smartphone 2.

Also, in the aforementioned configuration, it is possible to transmit position detection information of a touch panel from the control substrate 40 in the smartphone 2 to the control substrate 20 in the cover 1A by storing, in advance in the smartphone 2, an application software for allowing the determination circuit 33 to acquire position detection information of the touch panel.

(Second Embodiment)

Figure 6:
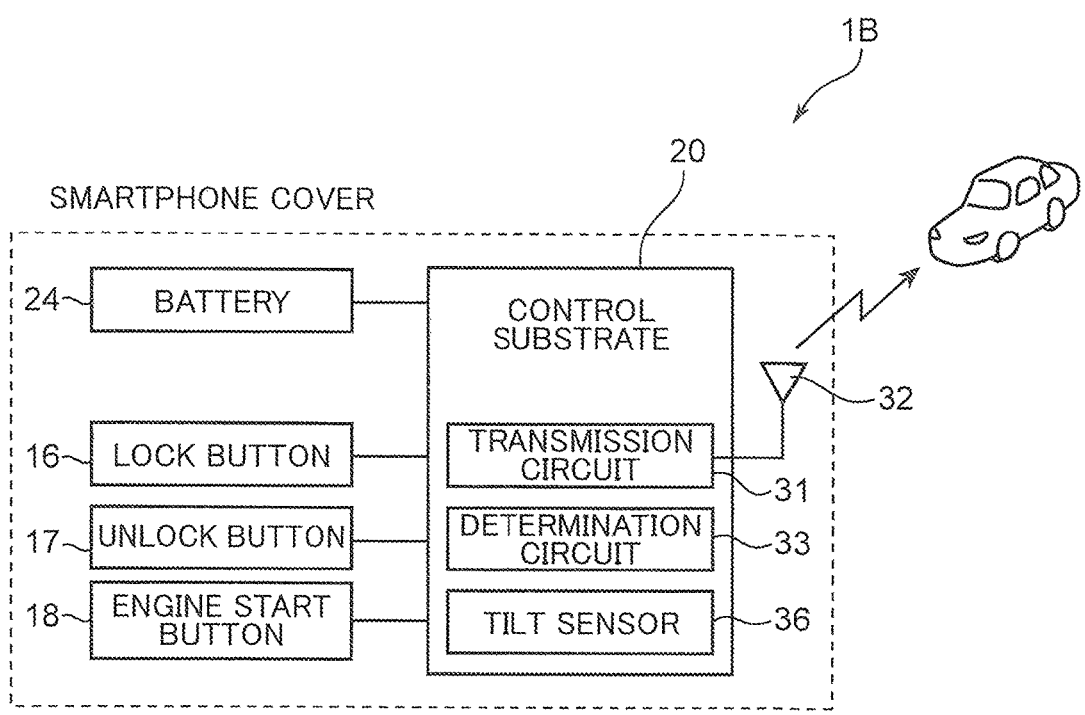
FIG. 6 is a block diagram illustrating an electrical configuration of a smartphone cover according to a second embodiment.

FIG. 6 is a block diagram illustrating an electrical configuration of a smartphone cover 1B (hereinafter, abbreviated as a cover 1B) according to a second embodiment. The basic configuration of the cover 1B in the second embodiment is the same as the configuration of the cover 1A in the first embodiment except for the following points.

Specifically, a control substrate 20 of the cover 1B in the second embodiment is not provided with a substrate-side connector 22 for connecting the cover 1B (control substrate 20) and a smartphone 2. The cover 1B is completely electrically independent of the smartphone 2. Therefore, the control substrate 20 is not provided with the I/F circuit 34, but is provided with a tilt sensor 36. The tilt sensor 36 is substantially the same as the tilt sensor 42 to be loaded in the smartphone 2.

In other words, in the cover 1B according to the second embodiment, the determination circuit 33 determines whether or not buttons 16 to 18 face upward on the basis of posture information to be detected by the tilt sensor 36 loaded in the control substrate 20, and restricts transmission of an operation signal by a transmission circuit 31 on the basis of the determination result. Transmission control of an operation signal by the cover 1B (control substrate 20) in this case is basically equivalent to the control illustrated in FIG. 4 except for a point that posture information is acquired from the smartphone 2.

Also, in the case of the cover 1B in the second embodiment, as well as the cover 1A in the first embodiment, it is possible to provide the smartphone 2 with a keyless operation function of a door lock mechanism or the like merely by mounting the cover 1B to the smartphone 2. Further, it is possible to prevent the aforementioned erroneous operation during use of the smartphone 2.

Further, according to the cover 1B in the second embodiment, as described above, the cover 1B is completely electrically independent of the smartphone 2. Therefore, it is possible to obtain the aforementioned advantageous effects no matter what type of smartphone 2 is mounted, regardless of the presence or absence of the aforementioned application (application software).

The smartphone cover 1A in the first embodiment, and the smartphone cover 1B in the second embodiment as described above are examples of preferred embodiments of the cover for a mobile device according to the present invention. A specific configuration of the smartphone cover may be modified as necessary as far as such modification does not depart from the gist of the present invention.

For instance, when the determination circuit 33 determines that the buttons 16 to 18 of the cover 1A (1B) do not face upward (Step S5, S5'), the determination circuit 33 outputs an inhibit signal to the transmission circuit 31, thereby restricting (inhibiting) transmission of an operation signal from the transmission circuit 31 (Step S11). Alternatively, signal transmission from the transmission circuit 31 may be restricted (inhibited) by locking a pressing operation of the buttons 16 to 18. Further, regarding the process of Step S11, it is possible to substantially restrict an operation of the door lock mechanism by applying a predetermined signal processing to an operation signal e.g. applying a signal processing in such a manner that recognition of an identification number to be included in an operation signal is disabled, and then causing the transmission circuit 31 to transmit an operation signal, in place of restricting (inhibiting) the transmission circuit 31 from transmitting an operation signal. Also, in the aforementioned configuration, it is possible to prevent an operation of the door lock mechanism or the like against the user's intention during use of the smartphone 2.

Further, in the cover 1A, the battery 24 is provided as a power source of the control substrate 20. Alternatively, a battery in the smartphone 2 may also be used as a power source for the control substrate 20. For instance, a terminal connectable to a battery charging terminal of a smartphone-side connector may be provided on the substrate-side connector 22, so that the control substrate 20 receives power supply from the battery in the smartphone 2. According to this configuration, the battery 24 in the cover 1A is not necessary. This makes it possible to simplify the configuration of the cover 1A. In this case, the smartphone-side connector functions as a device-side second connector of the present invention, and the substrate-side connector 22 functions as a cover-side second connector.

Further, in the cover 1A, the substrate-side connector 22 for connecting the cover 1A (control substrate 20) and the smartphone 2 is provided on the lower side portion 14b of the cover body 10 (peripheral wall portion 14). The position of the substrate-side connector 22 is changeable as necessary depending on the position of the smartphone-side connector.

Further, in the cover 1A (1B), the lock button 16 and the unlock button 17 of the door lock mechanism, and the engine start button 18 are provided as buttons for a keyless operation. It is possible to change the types of buttons for a keyless operation as necessary. For instance, a button for starting an air conditioner as a vehicle-mounted device may be additionally provided.

Further, the operation portion (buttons 16 to 18) provided on the cover 1A (1B) may be of a sliding type, in place of the buttons of a pressing type as described in the embodiments.

The cover 1A (1B) is configured, assuming that the user is a right-handed person. In view of this, the lock button 16, the unlock button 17, and the engine start button 18 are provided on the right side portion 14d of the cover body 10 so that the user using the smartphone 2 can operate the buttons 16 to 18 with the thumb of his/her right hand while holding the smartphone 2. Alternatively, the lock button 16, the unlock button 17, and the engine start button 18 may be provided on the left side portion 14c of the cover body 10, assuming that the user is a left-handed person.

In the embodiments, a smartphone cover is described as an example of the cover for a mobile device of the present invention. The present invention is also applicable to a cover for a smart device other than a smartphone such as a tablet PC, or for the other mobile devices.

The following is a summary of the present invention as described above.

Specifically, a cover for a mobile device according to the present invention includes a cover body to be mounted on a mobile device; an operation portion provided on the cover body, and capable of receiving an external operation; a transmission portion which transmits an operation signal for remotely operating a vehicle-mounted device when the operation portion receives the operation; a determination portion which determines whether or not the mobile device is in a specific state; and a restricting device which executes a process for restricting the remote operation when the determination portion determines that the mobile device is in the specific state.

According to the cover for a mobile device, it is possible to provide a mobile device with a keyless operation function such as a keyless entry function (a function of performing an operation of locking/unlocking a vehicle in a keyless manner) by merely mounting the cover to the mobile device such as a smartphone (mobile phone), a tablet PC, or the like. Further, when the mobile device is in a specific state, a process for restricting the remote operation is executed. This makes it possible to prevent an operation of a vehicle-mounted device against the user's intention when the mobile device is in the specific state.

More specifically, the restricting device may restrict the transmission portion from transmitting the operation signal, or may apply a process to the operation signal to be transmitted by the transmission portion so as to restrict the remote operation.

According to these configurations, it is possible to securely prevent an operation of a vehicle-mounted device against the user's intention during use of the mobile device.

More specifically, the cover for a mobile device may be mounted on a mobile device provided with a device-side first connector capable of outputting information indicating a usage state of the mobile device to an outside. The cover body may be provided with a cover-side first connector to be connected to the device-side first connector. The determination portion may acquire the information indicating a usage state of the mobile device from the mobile device via each of the device-side first connector and the cover-side first connector, and may determine that a state that the mobile phone is used is the specific state.

According to the aforementioned configuration, it is possible to more securely prevent an operation of a vehicle-mounted device against the user's intention during use of the mobile device on the basis of the information from the mobile device.

In this case, when the mobile device is provided with a tilt sensor which detects a posture of the mobile device, and is capable of outputting posture information to be detected by the tilt sensor to the outside, as the information indicating a usage state of the mobile device, the determination portion can acquire posture information to be output from the tilt sensor, and can determine that the mobile device is in the specific state when the operation portion is in a state other than a state that the operation portion faces upward on the basis of the posture information.

According to the aforementioned configuration, an appropriate operation signal is transmitted to operate a vehicle-mounted device only when the operation portion faces upward. This configuration makes it possible to prevent an operation of a vehicle-mounted device against the user's intention by using posture information to be detected by the tilt sensor provided in the mobile device.

As another specific configuration, the cover for a mobile device may further include a tilt sensor provided in the cover body, and configured to detect a posture of a mobile device. The determination portion may determine that the mobile device is in the specific state when the operation portion is in a state other than a state that the operation portion faces upward on the basis of posture information of the mobile device to be detected by the tilt sensor.

Also, in the aforementioned configuration, a vehicle-mounted device is operated only when the operation portion faces upward. According to this configuration, it is not necessary to acquire posture information from a mobile device. This is advantageous in increasing the degree of freedom of a mountable mobile device.

When the mobile device is provided with a device-side second connector capable of supplying electric power of a battery to be incorporated in the mobile device to an outside, the cover body may be provided with a cover-side second connector to be connected to the device-side second connector, and the transmission portion, the determination portion, and the restricting device may be operated by acquiring electric power from the mobile device.

According to the aforementioned configuration, it is possible to operate a vehicle-mounted device in a keyless manner without providing a power source in the cover for a mobile device.

When the mobile device is a smartphone or a tablet PC, preferably, the cover body may include a side surface portion of the cover which covers a side surface portion of the mobile device from the outside, the side surface portion being a periphery of a principal plane of the mobile device where a display portion of the smartphone or of the tablet PC is formed, and the operation portion may be formed on the side surface portion of the cover.

According to the aforementioned configuration, it is possible to provide a smartphone or the like with a keyless operation function without impairing operability of the smartphone or of a tablet PC.

The invention claimed is:

1. A detachable cover for a mobile device, comprising:
a cover body to be detachably mounted on the mobile device provided with a device-side first connector capable of outputting information indicating a usage state of the mobile device to an outside;
an operation portion provided on the cover body, and capable of receiving an external operation;
a transmission portion which transmits an operation signal for remotely operating a vehicle-mounted device when the operation portion receives the operation;
a determination portion which determines whether or not the mobile device is in a specific state; and
a restricting device which executes a process for restricting the remote operation when the determination portion determines that the mobile device is in the specific state, wherein
the cover body is provided with a cover-side first connector to be detachably connected to the device-side first connector, and
the determination portion acquires the information indicating the usage state of the mobile device from the mobile device via each of the device-side first connector and the cover-side first connector, and determines that a state that the mobile device is used is the specific state.

2. The detachable cover for a mobile device according to claim 1, wherein
the restricting device restricts the transmission portion from transmitting the operation signal.

3. The detachable cover for a mobile device according to claim 1, wherein
the restricting device applies a process to the operation signal to be transmitted by the transmission portion so as to restrict the remote operation.

4. The detachable cover for a mobile device according to claim 1, wherein
the mobile device is provided with a tilt sensor which detects a posture of the mobile device, and is capable of outputting posture information to be detected by the tilt sensor to the outside, as the information indicating the usage state of the mobile device, and
the determination portion acquires posture information to be output from the tilt senor, and determines that the mobile device is in the specific state when the operation portion is in a state other than a state that the operation portion faces upward on the basis of the posture information.

5. The detachable cover for a mobile device according to claim 1, wherein
the mobile device is provided with a device-side second connector capable of supplying electric power of a battery to be incorporated in the mobile device to an outside,
the cover body is provided with a cover-side second connector to be detachably connected to the device-side second connector, and
the transmission portion, the determination portion, and the restricting device are operated by acquiring electric power from the mobile device.

6. The detachable cover for a mobile device according to claim 1, wherein
the mobile device is a smartphone or a tablet PC,
the cover body includes a side surface portion of the detachable cover which covers a side surface portion of the mobile device from the outside, the side surface portion being a periphery of a principal plane of the mobile device where a display portion of the smartphone or of the tablet PC is formed, and
the operation portion is formed on the side surface portion of the detachable cover.

7. The detachable cover for a mobile device according to claim 1, wherein
the mobile device is provided with a touch panel which is configured so that an electric field is formed on a surface of the touch panel, and position detection is performed by detecting a change in surface electric charge of the touch panel touched by a user of the mobile device, and the touch panel is configured to output position detection information based on the position detection as the information indicating the usage state of the mobile device, and
the determination portion acquires the position detection information, and determines that the mobile device is in the specific state.

* * * * *